(12) United States Patent
Schudt et al.

(10) Patent No.: US 8,684,038 B2
(45) Date of Patent: Apr. 1, 2014

(54) SLIDE-TYPE PRESSURE CONTROL VALVE HAVING IMPROVED DAMPING BEHAVIOR

(75) Inventors: Klaus Schudt, Nordheim (DE); Kurt Gensheimer, Bad Liebenzell (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 13/219,032

(22) Filed: Aug. 26, 2011

(65) Prior Publication Data

US 2012/0048398 A1 Mar. 1, 2012

(30) Foreign Application Priority Data

Aug. 30, 2010 (DE) .......................... 10 2010 039 918

(51) Int. Cl.
*F16K 11/07* (2006.01)

(52) U.S. Cl.
USPC ................................. 137/625.68; 137/625.69

(58) Field of Classification Search
USPC ........................... 137/625.65, 625.68, 625.69
See application file for complete search history.

(56) References Cited

U.S. PATENT DOCUMENTS

| | | |
|---|---|---|
| 2004/0035476 A1 | 2/2004 | Holmes et al. |
| 2008/0072978 A1 | 3/2008 | Ishibashi et al. |
| 2009/0000677 A1 | 1/2009 | Inaguma et al. |

FOREIGN PATENT DOCUMENTS

| | | |
|---|---|---|
| DE | 198 29 549 | 12/1999 |
| DE | 103 25 070 | 12/2003 |

*Primary Examiner* — Craig Schneider
*Assistant Examiner* — R. K. Arundale
(74) *Attorney, Agent, or Firm* — Kenyon & Kenyon LLP

(57) ABSTRACT

A slide-type pressure control valve having an improved damping behavior is described.

14 Claims, 4 Drawing Sheets

SLIDE-TYPE PRESSURE CONTROL VALVE HAVING IMPROVED DAMPING BEHAVIOR

CROSS REFERENCE

The present application claims the benefit under 35 U.S.C. §119 of German Patent Application No. DE 102010039918.3, filed on Aug. 30, 2010, which is expressly incorporated by reference in its entirety.

FIELD OF THE INVENTION

The present invention relates to a pressure control valve, in particular for an automatic transmission in a motor vehicle.

BACKGROUND INFORMATION

Hydraulically operated clutches are used for shifting gears in modern automatic transmissions of automobiles. To enable these switching operations to take place smoothly and without being noticeable to the driver, it is necessary to set the hydraulic pressure at the clutches with maximum precision according to predefined pressure ramps. Electromagnetically operated pressure control valves are used for this purpose. These valves may be designed either as seat valves or slide valves. As a rule, both structural designs have three hydraulic ports for inflow, control pressure and return flow.

In slide valves, the use of damping diaphragms or damping throttles has proven to be particularly advantageous for showing the necessary damping action. This takes advantage of the effect that hydraulic oil is displaced during movement of the control piston. When this hydraulic oil flows through a damping diaphragm or damping throttle, a pressure drop sets in which damps the movement of the control piston as a function of speed. A diaphragm or throttle having a shorter length compared to the hydraulically effective cross section is particularly advantageous because the damping effect is virtually independent of the oil temperature or the viscosity of the hydraulic oil. A sufficiently constant damping behavior over a wide range of operating temperatures is obtained thereby.

Numerous examples of conventional slide valves use damping diaphragms and/or damping throttles of this type.

A slide valve having an internal damping diaphragm and an external damping diaphragm in the working port of the pressure control valve is described in German Patent No. DE 198 29 549 B4.

In the slide valve described in U.S. Patent Application Publication No. 2009/0000677 A1, the damping diaphragm is situated in the return port.

A slide valve having a damping diaphragm at the tank port and a damping throttle in the working port is described in U.S. Patent Application Publication No. 2008/0072978 A1.

A pressure control valve is described in German Patent No. DE 103 25 070 A1 which has two damping ends in the working pressure port adjacent to the end face of the control piston.

The disadvantage of the conventional approaches in which the damping diaphragm is situated in the working port, is the fact that this necessitates additional sealing points on the pressure control valve. If the working pressure is namely supplied not only to the direct consumer port but also to the damping diaphragms, a corresponding seal must also be provided in that location, or additional leakage quantities must be taken into account.

In addition, a force effect of the pressure upon the piston is present whenever the damping diaphragms are used in the area of the pressure control valve to which pressure is applied. This force effect is undesirable and may be reduced by not using the entire piston surface of the control piston as the displacement volume but rather only an annular surface in the piston. However, this also reduces the displaced volume and thus the damping effect.

If diaphragm damping is implemented in the unpressurized tank port, the problem arises that filling this unpressurized chamber with oil is not reliably ensured.

SUMMARY

In the example pressure control valve according to the present invention, the control piston is designed as a stepped piston in which the two unpressurized end face volumes, hereinafter referred to as the first displacement chamber and the second displacement chamber, are used to damp the control piston movement as a function of speed during each movement of the control piston. Both displacement chambers are tightly sealed and do not require any additional seals. The hydraulic oil which is displaced due to an actuating movement of the control piston flows through the control piston and the damping arrangement according to the present invention. According to the present invention, the damping arrangement is attached in the direct vicinity of the tank outlet, so that hydraulic oil which flows from the valve inflow to the tank via the working port floods the displacement chambers and the damping means and thus prevents the damping volumes from running dry.

A further advantage of the example pressure control valve according to the present invention is also to be seen in the fact that it may be very easily implemented from an engineering perspective and does not require any additional individual parts. The pressure control valve according to the present invention is characterized by low overall costs.

In a further advantageous embodiment of the present invention, it is possible to provide a rib on the control piston which separates a third compensating chamber from the second compensating chamber, these compensating chambers also being hydraulically connected to each other by a damping element.

According to the present invention, the damping elements between the compensating chambers may be designed as a throttle hole as well as a flattened area, a groove or a notch in the rib of the control piston, or they may be provided directly on the control piston.

The damping element may also be provided by a suitable clearance fit between the rib of the damping piston and the control piston and the guide bore and thus as a circular annular gap.

Of course, combinations of these damping elements are also possible. Common to all described damping elements is the fact that they are easy to manufacture and do not require any additional components. Even the rib between the second and third compensating chambers forms a single piece with the control piston so that no additional manufacturing and assembly complexity are incurred.

The damping elements are also preferably situated at the end of the control piston which is located in the direct vicinity of the return port, so that the inner leakages which occur fill the compensating chambers with hydraulic oil without any further action being necessary. This maintains the damping effect reliably and over the entire life cycle of the pressure control valve according to the present invention.

To ensure that the inflow pressure does not act upon the end face of the control piston and negatively influence the pressure control function thereof, the end face of the slide sleeve is sealed in a pressure-tight manner. An easy-to-manufacture approach is to press a sealing plug onto the end face of the slide sleeve. The sealing plug may be implemented from plastic or as a punched and bent part made of sheet metal. Both variants may be non-detachably and tightly mounted on the slide sleeve with the aid of a simple press connection.

The pressure control function is implemented by the fact that the valve has a control piston which hydraulically connects a working port to the supply port in an open end position and hydraulically separates the working port from a return port. In the non-activated state, this means that when the coil of an electromagnetic actuating device is not energized, its armature moves in the direction of opening with the aid of the helical spring mounted on the magnet and moves the control piston in the direction of an opened end position of the pressure control valve via a push rod. The first section of the control piston thus releases the inflow pressure opening, and the pressure medium flows into an annular chamber which is delimited by the slide sleeve and the control piston. Since the third section of the control piston simultaneously separates the return opening from the annular chamber, the pressure prevailing at the supply port is also present at the working port.

When the coil is energized, the electromagnetic force acts against the restoring force of the spiral spring on the magnet side, which has deflected the control piston in the direction of the end face. The control piston is moved back into the closed end position by the restoring spring mounted on the piston side. In the closed end position, the control piston seals the inflow pressure opening and simultaneously releases the return opening. Because tank pressure is present in the return opening and this tank pressure is lower than the working pressure prevailing in the annular chamber, the pressure medium flows to the return port via the return opening.

The same applies to an electromagnetic actuating device, which is not described in further detail herein and which operates without a spiral spring on the magnet side and whose electromagnet acts in the opposite direction. Through these means, the supply port is closed in the de-energized state and the return opening is closed in the energized state.

In the example pressure control valve according to the present invention, the force which acts upon the control piston against the direction of opening depends on the pressure instantaneously prevailing at the control pressure opening. If the pressure drops at the control pressure opening, the force acting upon the control piston against the direction of opening is also reduced, and the control piston is moved in the direction of opening. However, if the pressure prevailing at the control pressure opening increases, the force acting upon the control piston against the direction of opening also increases, whereby it moves against the direction of opening. This self-control function of the control piston is achieved by the fact that the hydraulic surface acting in the direction of opening differs from the hydraulic surface acting against the direction of opening.

This difference between the hydraulic surfaces acting against and in the direction of opening is achieved by the stepped guide bore in the slide sleeve, which has a smaller diameter in the first section of the control piston than it does in the third section of the control piston.

All in all, a pressure control valve is obtained by the present invention, which provides a precise self-control function and simultaneously ensures a simple structural design and correspondingly low manufacturing costs.

It is also beneficial that the control piston has a first control edge which throttles the pressure medium flow which flows from the supply port to the working port when the control piston is in an intermediate position. The control piston also has a second control edge which throttles the pressure medium flow which flows from the working port to the return port when the control piston is in an intermediate position between the open and closed end positions. This makes it possible to implement a continuous control pressure characteristic of the valve.

It is particularly helpful if the control piston has at least one channel which connects the first compensating chamber in the area of the supply port to the second compensating chamber on the opposite end of the control piston. As a result, the same hydraulic pressure is present at the end faces of the control piston and the control pressure function is ensured.

In addition, the channel may be designed as a combination of a longitudinal bore and a throttle bore. This makes the control piston for the example pressure control valve according to the present invention easy and economical to manufacture.

DETAILED DESCRIPTION OF EXAMPLE EMBODIMENTS

Figure 1:
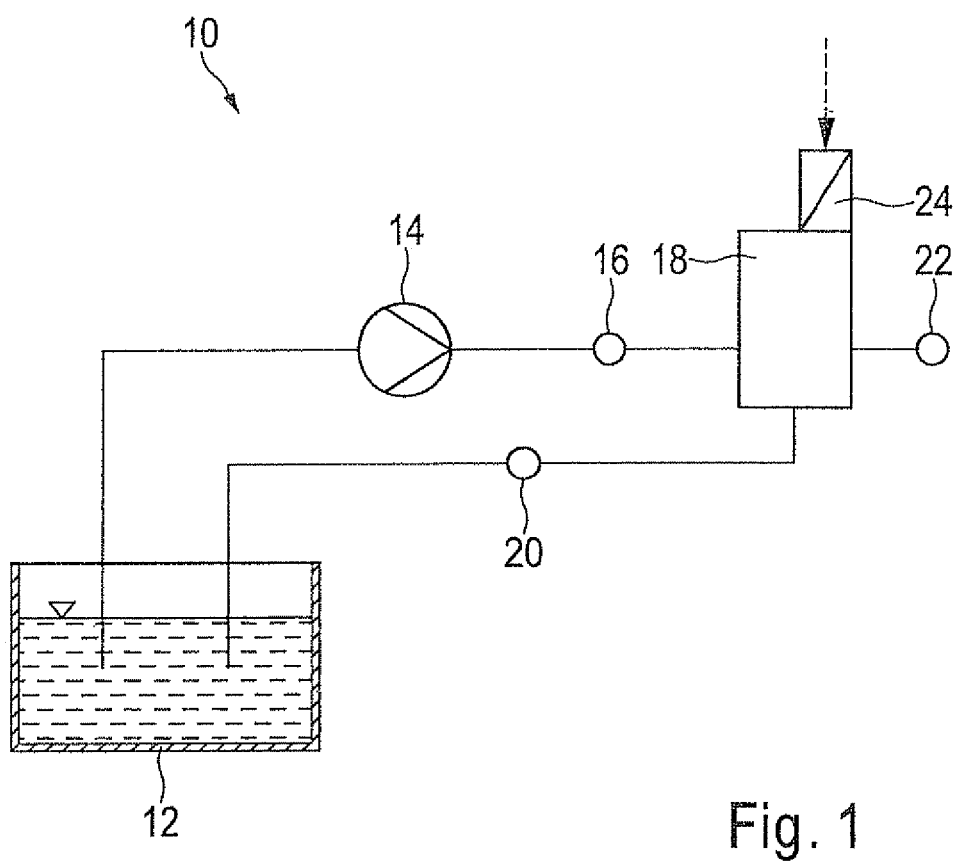
FIG. 1 shows a schematic representation of a hydraulic circuit in which a pressure control valve according to the present invention is used.

Among other things, a hydraulic circuit 10, to which an unpressurized hydraulic reservoir 12 and a hydraulic pump 14 belong, is used to control automatic transmissions as they are used in automobiles, for example. An outlet of hydraulic pump 14 forms a supply port 16, to which a pressure control valve 18 is connected.

A return flow to a return port 20, which leads back to a hydraulic oil reservoir 12, leads from pressure control valve 18. Furthermore, pressure control valve 18 is connected to a working port 22 at which the pressure to be controlled by pressure control valve 18 is present. In addition, pressure control valve 18 has an electromagnetic actuating device 24.

Figure 2:
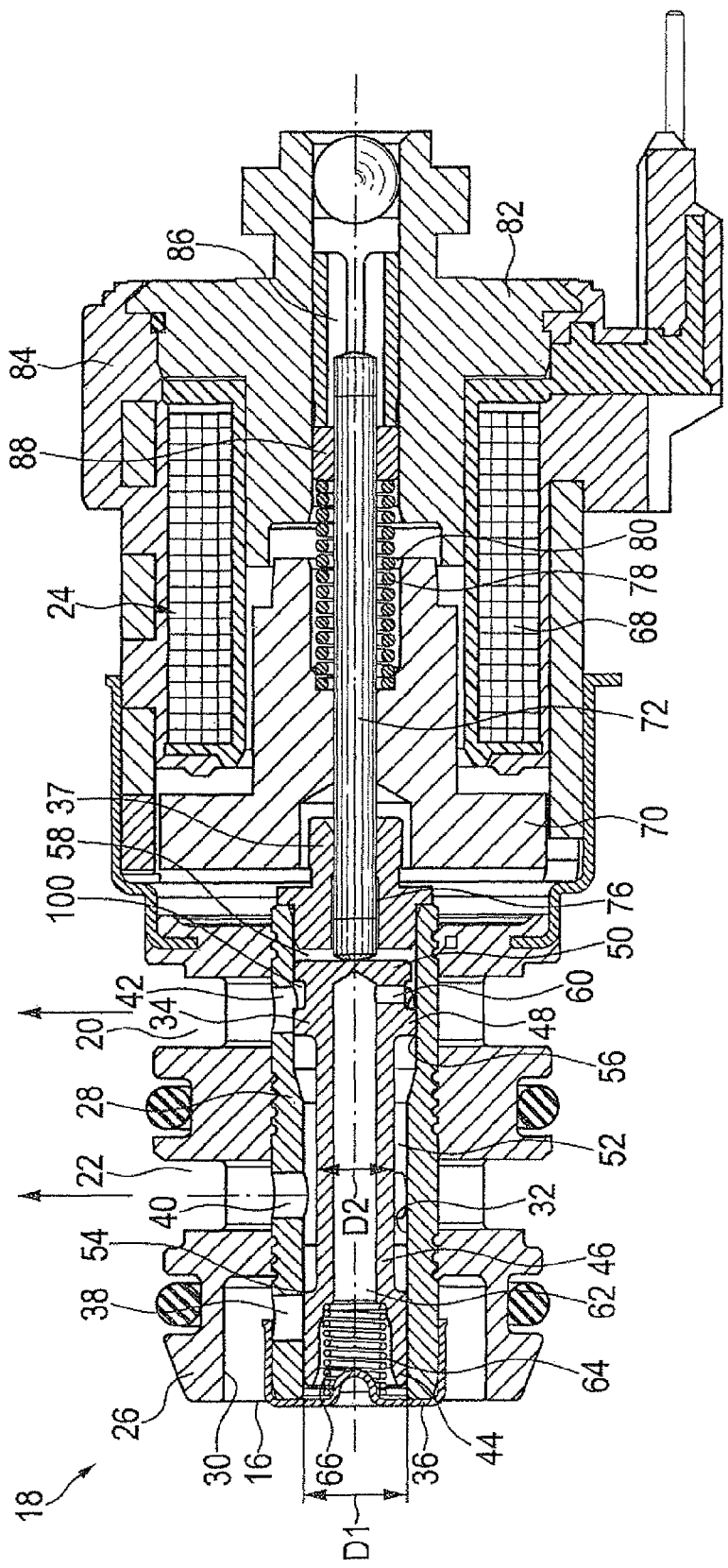
FIG. 2 shows a partial section of a pressure control valve according to the present invention.

FIG. 2 shows the structure of a pressure control valve 18 according to the present invention. Pressure control valve 18 includes a valve connecting element 26, which is preferably manufactured from plastic. Valve connecting element 26 has a concentric recess (without a reference numeral), into which a slide sleeve 28 is inserted in such a way that it forms an annular inflow channel 30 together with valve connecting element 26. Slide sleeve 28 has a continuous and stepped guide bore 32, which is used to accommodate a control piston 34. On the left side in FIG. 2, the end face of slide sleeve 28 is sealed pressure-tight by a sealing cap 36, which may be pressed on or shrunk-fitted, for example.

The opposite side (on the right in FIG. 2) of slide sleeve 28 is sealed by a bearing bush 37. Three openings 38, 40 and 42 are situated side-by-side in the axial direction on the circumference of slide sleeve 28. The first opening, hereinafter referred to as inflow pressure opening 38, in slide sleeve 28 opens guide bore 32 in the direction of inflow channel 30 and thus in the direction of supply port 16 when control piston 34 is correspondingly activated.

FIG. 2 shows pressure control valve 18 in the equilibrium position, so that no hydraulic connection exists between inflow channel 30 and guide bore 32. This equilibrium position is an intermediate position between the open and closed end positions.

The second transverse bore in slide sleeve 28, which is identified below as control pressure opening 40, connects guide bore 32 to working port 22. The third transverse bore, hereinafter referred to as return opening 42, establishes a hydraulic connection between guide bore 32 and return port 20. Control piston 34 is divided into four adjacent sections 44, 46, 48 and 50 in the axial direction. Outermost left and first section 44 in FIG. 2 has a first diameter D1. Control piston 34 is guided within guide bore 32 with the aid of this first diameter D1.

The approximately centrally situated second section 46, which adjoins first section 44, has a second diameter D2 which is smaller than first diameter D1 and which is smaller than the diameter of guide bore 32 in this area. This results in an annular chamber 52.

Third section 48, which adjoins second section 46, has a larger diameter than first section 44 and is guided sealingly but axially slidable in guide bore 32 of slide sleeve 28. This delimits annular chamber 52 in the axial direction.

In fourth and final section 50, the diameter of control piston 34 is smaller than that of guide bore 32. This results in a second compensating chamber 58, which is delimited in the axial direction by bearing bush 37 and push rod 72.

Due to this particular form of control piston 34, second section 46 of control piston 34 and slide sleeve 28 form an annular chamber 52 which communicates with working port 22 via control pressure opening 40. The edge of first section 44 which faces second section 46 forms a first control edge 54 whose function is discussed in greater detail below.

The edge of third section 48 which faces second section 46 forms a second control edge 56. Control piston 34 has a transverse bore 60 in the fourth section. A longitudinal bore 62, which penetrates control piston 34 along its entire length, adjoins transverse bore 60. As a result, the same pressure prevails in first compensating chamber 64 and in second compensating chamber 58.

A first spiral spring 66, which is supported against control piston 34, on the one hand, and against sealing cap 36, on the other hand, is located in first compensating chamber 64, which in this case is designed as a recess on the end face of control piston 34, the sealing cap sealing the end face of slide sleeve 28.

In FIG. 2, electromagnetic actuating device 24 is situated on the right side of pressure control valve 18. It includes, among other things, an annular coil 68 and a centrally situated armature 70. A push rod 72, which is situated coaxially to armature 70, transmits the actuating movement of armature 70 to control piston 34.

First spiral spring 66 holds control piston 34 in contact with push rod 72. Push rod 72 is guided sealingly but axially slidable in a through-opening 76 in bearing bush 37, which seals slide sleeve 28.

A second spiral spring 78 is pushed onto piston rod 72 in a concentric recess 80 of armature 70. Spiral spring 78 is supported on armature 70, on the one hand, and on a coil core 82, on the other hand. Coil core 82 simultaneously forms a cover for a housing 84 in which electromagnetic actuating device 24 is situated. A slide bearing 88, which accommodates the end of piston rod 72 facing away from armature 70, is introduced into a coaxial bore 86 in coil core 82.

Pressure control valve 18 operates as follows: When electromagnetic actuating device 24 pushes control piston 34 into the open position due to spiral spring 78 in the de-energized state of coil 68 (to the left in FIG. 2; not illustrated), hydraulic oil flows under high pressure from supply port 16 to annular chamber 52 via inflow pressure opening 38 and from the annular chamber to working port 22 via control pressure opening 40. Return opening 42 in this case is largely covered by second control edge 56. Return port 20 is thus largely separated from annular chamber 52. As a result, the same pressure thus prevails at both working port 22 and supply port 16.

However, if control piston 34 is in a rather right-hand position, for example when the coil is energized, inflow pressure opening 38 is covered by first control edge 54, and annular chamber 52 is thus largely separated from supply port 16. Instead, second control edge 56 now releases return opening 42 so that working port 22 communicates with return port 20 via control pressure opening 40, annular chamber 52 and return opening 42. In this way, the pressure prevailing at working port 22 is reduced via return port 20 because, in a first approximation, ambient pressure prevails there.

The different intermediate positions of control piston 34 make it possible to set any pressure in working port 22; the pressure cannot be higher than in supply port 16 and not lower than in return port 20.

The position of control piston 34 results from the equilibrium of forces between the hydraulic forces acting upon control piston 34 and push rod 72 and the restoring force of first spiral spring 66, on the one hand, and between the force applied to control piston 34 by electromagnetic actuating device 24 via push rod 72 and the force present at armature 70, due to second spiral spring 78, on the other hand.

To maintain the pressure control function, it is important that the sum of the hydraulic forces applied to the end faces of control piston 34 is approximately equal to zero in a state of equilibrium, as shown in FIG. 2. This is ensured by the fact that first compensating chamber 64, which is provided to the left of control piston 34 in FIG. 2 and in which first spiral spring 66 is situated, communicates with return opening 42 via longitudinal bore 62 and transverse bore 60 as well as with second compensating chamber 58, which is provided to the right of control piston 34 in FIG. 2. Thus, the tank pressure present at return port 20 or in return opening 42 prevails in both compensating chambers 58 and 64.

Sealing element 36 of slide sleeve 28 ensures that the inflow pressure does not act upon an end face of control piston 34.

Figure 3:
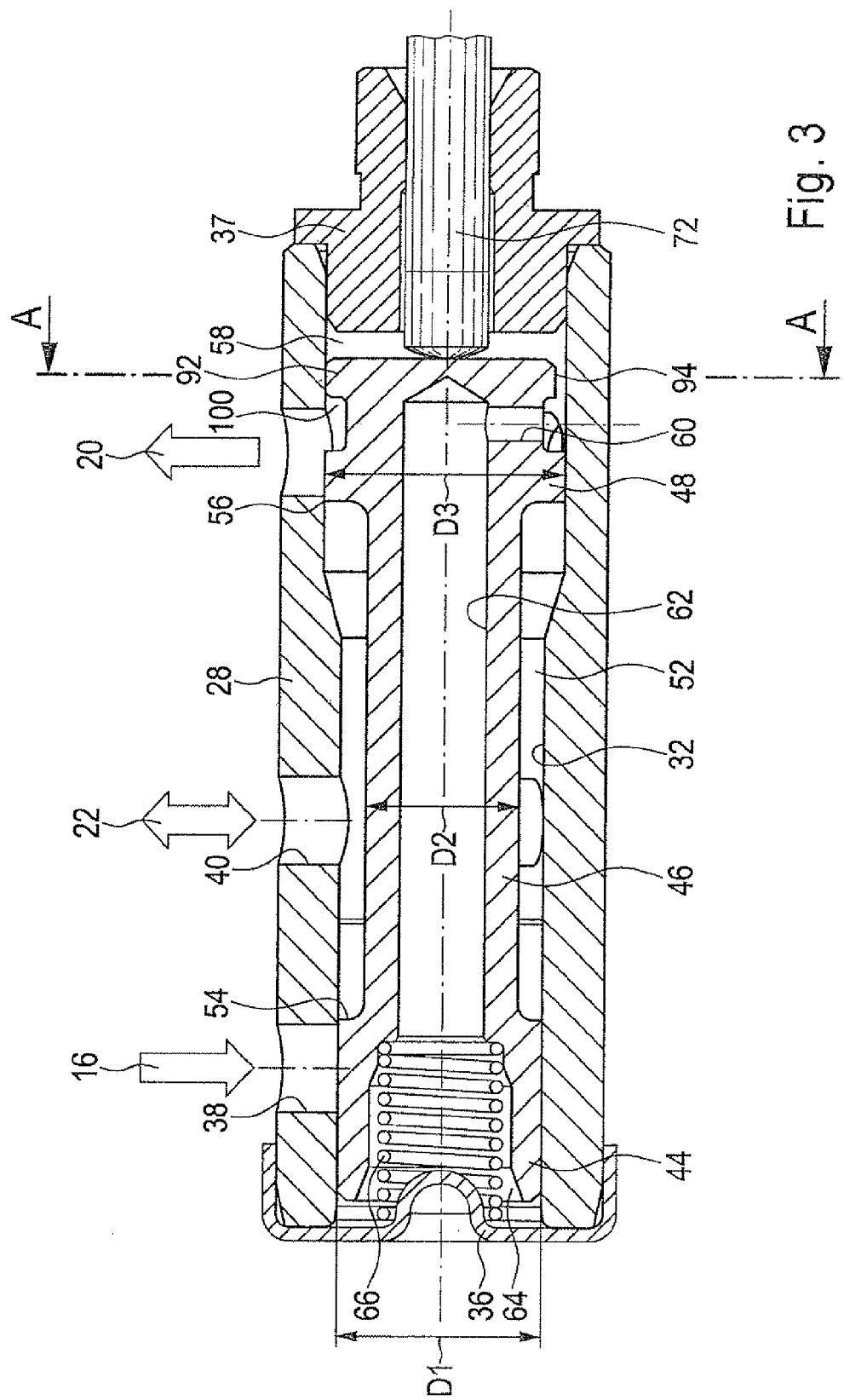
FIG. 3 shows an enlarged representation of the pressure control valve according to the present invention.
Figure 4:
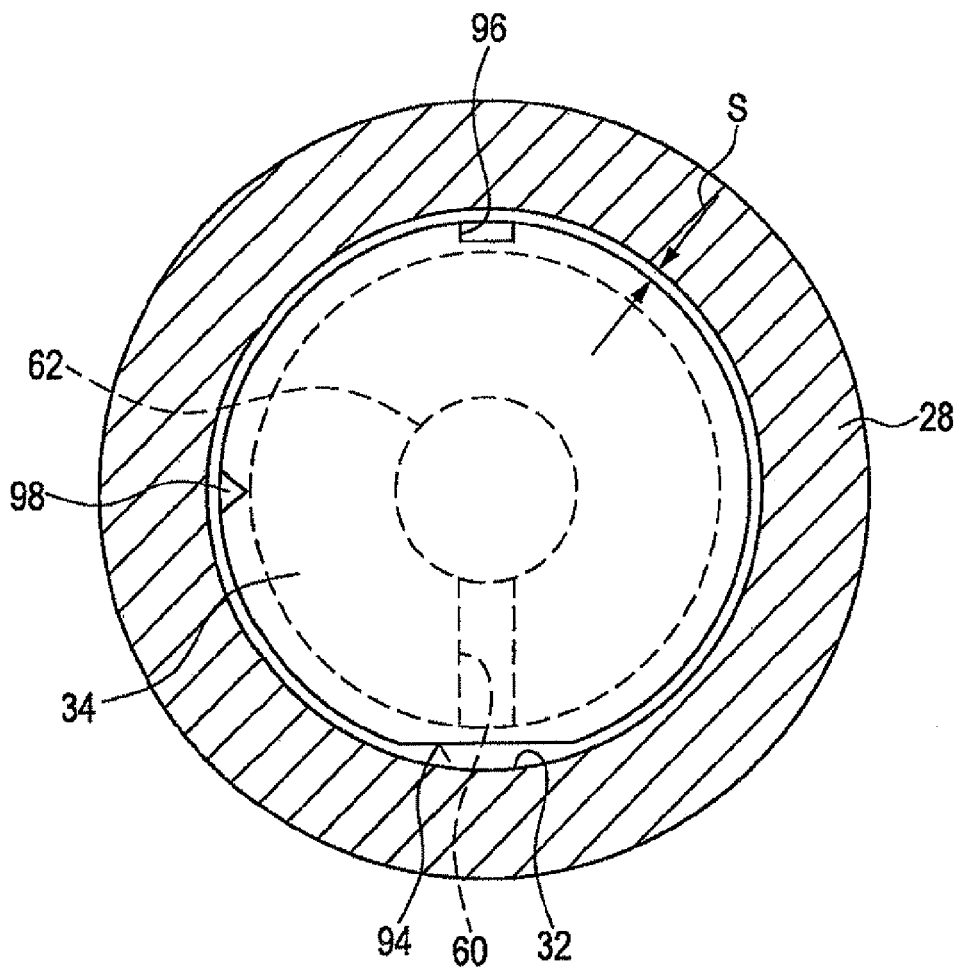
FIG. 4 shows a sectional view along A-A from FIG. 3.

The main structural features of the example control piston 34 in accordance with the present invention are illustrated in an enlarged view in FIGS. 3 and 4.

As shown in FIG. 3, a circumferential rib 92, which separates a third compensating chamber 100 from second compensating chamber 58, is provided on the end of control piston 34 facing push rod 72.

A flattened area 94, which represents a possible damping element, is provided on the lower edge of rib 92 in FIG. 3. A second damping element is transverse bore 60 (serving as a throttle), which connects longitudinal bore 62 to the third compensating chamber. Of course, it is also possible (although not illustrated in FIG. 3), to dispense with rib 92 and to use throttle 60 as the only damping element. It is also possible to provide a diaphragm instead of throttle 60.

In the slide valve according to the present invention, however, the volume changes in first compensating chamber 64 and second compensating chamber 58 which occur during each movement of control piston 34 result in liquid hydraulic oil flowing from one chamber to the other through throttle 60 and longitudinal bore 62. The pressure of supply port 16 or the pressure of working port 22 is not applied to first compensating chamber 64 and second compensating chamber 58; instead these chambers are more or less unpressurized.

Consequently, the energy losses caused by the damping action according to the present invention are very small. The fact that only actuating movements of control piston 34 produce a damping effect, and they do so independently of the hydraulic oil flowing through supply port 16 or working port 22, is also ensured.

FIG. 4 shows a sectional view along line A-A, in which the shape of flattened area 94 and alternative embodiments of damping elements in the form of a groove 96 and a notch 98 are easily identified.

FIG. 4 shows a gap S between the outer diameter of rib 92 and the inner diameter of guide bore 32. If this gap is correspondingly dimensioned, an annular gap (without a reference numeral) results, which also has the damping effect according to the present invention.

At the same time, this also makes it possible to reliably remove air bubbles from second compensating chamber 58 via the annular gap. This may also be achieved by the fact that groove 96 or another damping arrangement is situated on the highest point on rib 92 in the installed position, as shown in FIG. 4. Alternatively, multiple damping arrangements may also be distributed over the circumference of rib 92.

What is claimed is:

1. A pressure control valve for an automatic transmission in a motor vehicle, the pressure control valve having a supply port, a working port, and a return port, the pressure valve comprising:
    a control piston;
    a sealing cap;
    a bearing bush; and
    a slide sleeve, wherein the control piston is sealingly guided by a first section in a guide bore of the slide sleeve and a first section of the control piston, the guide bore and the sealing cap delimit a first compensating chamber, the control piston is sealingly guided by a third section in the guide bore of the slide sleeve and a third section of the control piston, and the guide bore and the bearing bush delimit a second compensating chamber; wherein the first compensating chamber and the second compensating chamber are hydraulically connected to each other, and at least one damping element is situated between the first compensating chamber and the second compensating chamber, wherein the sealing cap tightly closes the slide sleeve at an end face of the slide sleeve.

2. The pressure control valve as recited in claim 1, wherein the control piston has a rib, the rib of the control piston separating a third compensating chamber from the second compensating chamber, and wherein the second compensating chamber and the third compensating chamber are hydraulically connected to each other by the damping element.

3. The pressure control valve as recited in claim 1, wherein the damping element is at least one of a flattened area, a groove, a notch, and a bore.

4. The pressure control valve as recited in claim 2, wherein the damping element is a circular annular gap between the rib of the control piston and the guide bore.

5. The pressure control valve as recited in claim 1, wherein the slide sleeve is tightly sealed on an end face in the supply port.

6. The pressure control valve as recited in claim 5, wherein the slide sleeve is sealed by the sealing cap which is pressed onto the end face.

7. The pressure control valve as recited in claim 1, wherein the control piston hydraulically connects the working port to the supply port in an open end position and hydraulically separates the working port from the return port.

8. The pressure control valve as recited in claim 1, wherein the control piston hydraulically connects the working port to the return port in a closed end position and hydraulically separates the working port from the supply port.

9. The pressure control valve as recited in claim 1, wherein the control piston has a first control edge, and the first control edge throttles a pressure medium flowing from the supply port to the working port when the control piston is in an intermediate position.

10. The pressure control valve as recited in claim 9, wherein the control piston has a second control edge, and the second control edge throttles the pressure medium flowing from the working port to the return port when the control piston is in an intermediate position.

11. The pressure control valve as recited in claim 2, wherein the control piston has at least one channel which connects the first compensating chamber to at least one of the second compensating chamber and to the third compensating chamber.

12. The pressure control valve as recited in claim 11, wherein the channel includes a longitudinal bore and wherein the damping element includes a throttle bore included in the channel.

13. The pressure control valve as recited in claim 1, wherein the first compensating chamber and the second compensating chamber are unpressurized.

14. The pressure control valve as recited in claim 1, wherein, as a result of the hydraulic connection between the first compensating chamber and the second compensating chamber, a sum of the hydraulic forces applied to end faces of the control piston is approximately equal to zero in a state of equilibrium.

\* \* \* \* \*